(12) United States Patent
Costa e Silva

(10) Patent No.: US 6,793,145 B2
(45) Date of Patent: Sep. 21, 2004

(54) DUAL CONTROL THERMOSTATIC MIXER

(75) Inventor: Manuel Joaquim Costa e Silva, Braga (PT)

(73) Assignee: Euroexpor-Equipamentos Metalicos e nâo Metálicos para Construcâo Civil, Lda, Braga (PT)

( * ) Notice: Subject to any disclaimer, the term of this patent is extended or adjusted under 35 U.S.C. 154(b) by 0 days.

(21) Appl. No.: 10/376,294

(22) Filed: Mar. 3, 2003

(65) Prior Publication Data

US 2003/0201332 A1 Oct. 30, 2003

(30) Foreign Application Priority Data

Mar. 1, 2002 (PT) .............................................. 102 734

(51) Int. Cl.⁷ .............................................. G05D 23/13
(52) U.S. Cl. ................................ 236/12.17; 236/12.11; 137/625.41; 137/896
(58) Field of Search .......................... 236/12.11, 12.12, 236/12.16, 12.17, 12.23; 137/625.41, 896, 897, 898

(56) References Cited

U.S. PATENT DOCUMENTS

| | | | | |
|---|---|---|---|---|
| 4,674,678 A | * | 6/1987 | Knebel et al. ............ | 236/12.12 |
| 4,700,885 A | * | 10/1987 | Knebel ..................... | 236/12.16 |
| 4,738,393 A | * | 4/1988 | Bergmann et al. ........ | 236/12.16 |
| 4,819,867 A | * | 4/1989 | Delpla et al. ............. | 236/12.16 |
| 4,978,059 A | * | 12/1990 | Nicklas et al. ........... | 236/12.17 |
| 5,110,044 A | * | 5/1992 | Bergmann ................ | 236/12.16 |
| 2004/0000594 A1 | * | 1/2004 | Beck et al. ............... | 236/12.15 |
| 2004/0016815 A1 | * | 1/2004 | Bergmann et al. ........ | 236/12.11 |

* cited by examiner

*Primary Examiner*—Marc Norman
(74) *Attorney, Agent, or Firm*—Oblon, Spivak, McClelland, Maier & Neustadt, P.C.

(57) ABSTRACT

The present invention refers to a dual control thermostatic mixer with a regulator suited to stabilize the mixed water temperature upon exit, using a stabilizing mechanism and a switching device for choosing either spout or handset flow. It has a main body (A), a close, setting and commutation valve (B), a switch handle lever (C) and a water temperature-regulating knob (D). The main body of the mixer (A) has central part internally divided and separated by four ringed chambers were the switching valve set (B) operates.

The switching valve set is made of a thermostatic regulator and a switching device that allow to regulate the water's temperature keeping it constant for use with a handset or directly to the spout.

6 Claims, 10 Drawing Sheets

DUAL CONTROL THERMOSTATIC MIXER

The invention refers to a dual control thermostatic mixer, which includes a thermostatic regulator for stabilizing the temperature of the water outlet with a stability mechanism and a switch device between both water outlets (Spout and Handset).

Usually a thermostatic mixer is built by a body that confines a mixing chamber, fed by a hot water entrance supply plus a cold water entrance supply, a mixed-water exit channel with a predefined temperature as well as a temperature adjusting device for both hot and cold water supplies in order to obtain a water exit flow at the referred controlled temperature. This temperature adjusting device embraces a thermostatic element sensitive to the water temperature inside the mixing chamber and controls the inlet flow from both hot an cold water supplies in order to adjust the water outlet at the desired temperature. Besides this, when this thermostatic mixer is meant to be used as a bath mixer, i.e., having two outlets, for instance, one for the bath and another one for the shower, it incorporates a switching device (shift-valve) that can be used to switch from a direct water outlet to the bath or to the shower handset.

The purpose of the invention is to offer a dual control thermostatic mixer that, besides having the ability to work as a classic thermostatic mixer can also offer the inclusion of a switching device without being necessary to use an alternate and independent switch-valve, that, as far as the inventor's knowledge of building techniques, simply does not exist at the present date. The invention presents just this in a practicable way.

In order to meet this target a dual control thermostatic mixer was designed and built to control not only the outlet water temperature but also the place from where the water comes out, which consists in a body with a shutter, a regulator and a switch-valve, that make all above functions possible.

The dual control thermostatic mixer allows a rigorous control of both cold and hot water inlet flows so that it is possible to have on one of the two outlets a constant temperature no matter how much cold or hot water is flowing. Using this mixed-water system prevents a temperature-shock, i.e., having a high-temperature or low temperature on the outlet. The thermostatic valve, according to the invention, can be used with a range of pressures from 100 g/cm$^2$ to 100 Kg/cm$^2$ and with unbalanced water pressure between the entrance of cold and hot water supply of 9.9 Kg/cm$^2$.

The mixed water temperature is achieved through the thermostatic element and a stabilizing mechanism of the element itself, being the thermostatic element tuned from factory tuned from 36° C. to 42° C., preferably at about 35° C. It is also possible to change the thermostatic element's tuning from 20° C. to 55° C., nevertheless it is factory tuned for a 36° C. to 42° C. range, this being done by a manual regulating mechanism.

One of the most important aspects of the way the mixer was developed according to the invention, is the simple fact that if either hot or cold water supplies fail or are shut down, the thermostatic element automatically cuts off water supply avoiding the flow of just hot or just cold water to the user.

Switch between water exits is done through the use of a handle that works within a reprieved mechanism, which opens a collar ring or chamber that connects to the spout leading the water displacement either through the spout or through the handset.

The above mentioned handle spins angularly and causes the displacement of the shift-valve along the main axis of the shifting set, causing the water mixing chamber to become in contact with the chamber that communicates with the handset exit, closing the chamber of the spout exit or vice-versa. The angular rotation movement of the handle is preferably of 90°.

Fine-tuning of the temperature of the water upon exit is done through a knob located on top of the switch-valve handle. As mentioned before, this tuning can go above or down of the factory preset temperature.

One of the purposes of the invention is the possibility of regulating the temperature of the mixed-water, keeping it constant and at the same time flowing through the handset or the spout.

The dual control thermostatic mixer, according to the present invention, will now be described on a basis of embodiment, given as a non limitative example, with the help of the attached drawings as described below:

Figure 2:
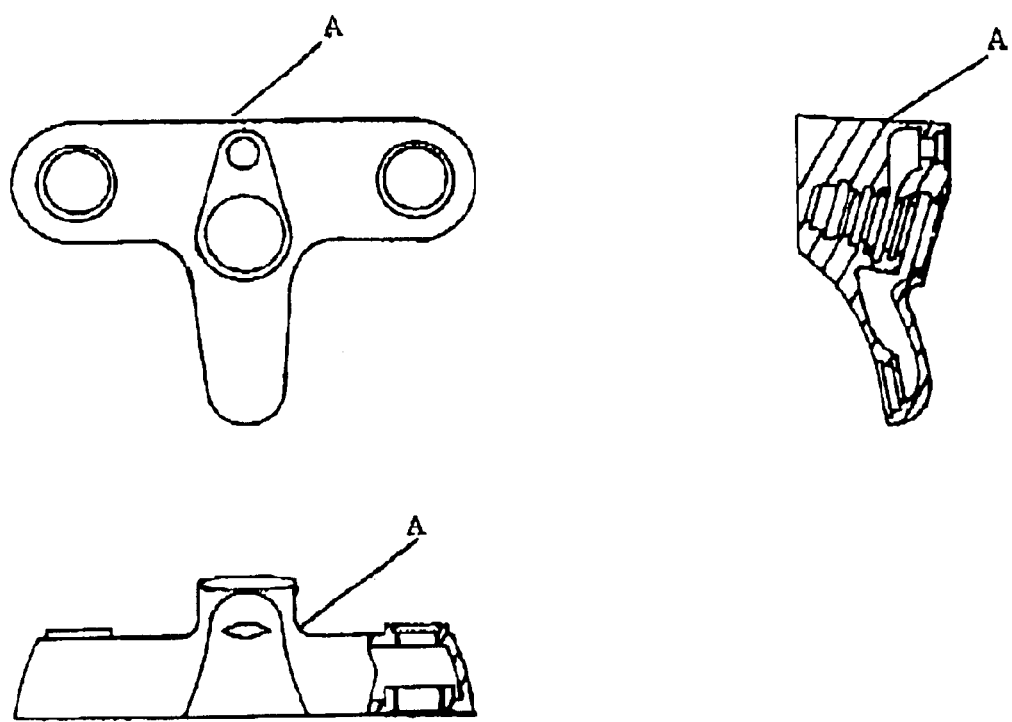
FIG. 2 is a top view over the body, one from behind and one from a cross sectional cut of the mixer; according to the present invention.
Figure 1:
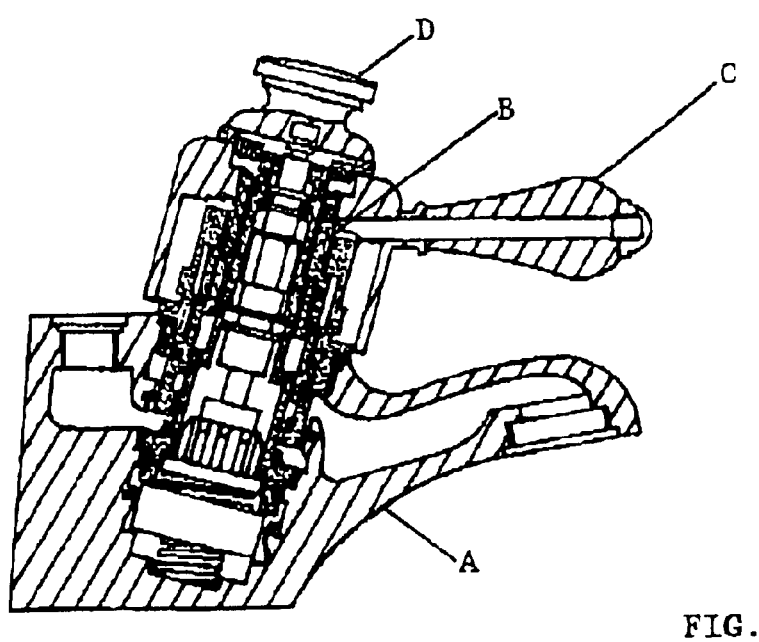
FIG. 1 is a cross sectional cut view through the main axis of a dual control thermostatic mixer, according to the present invention.
Figure 3:
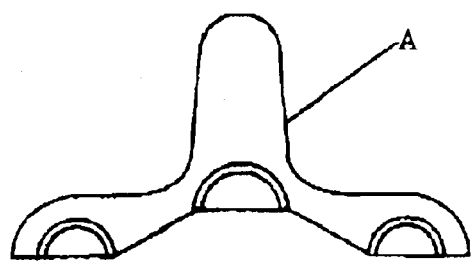
FIG. 3 is a back cut view behind the mixer according to the schematics shown in the upper part of the figure.
Figure 3:
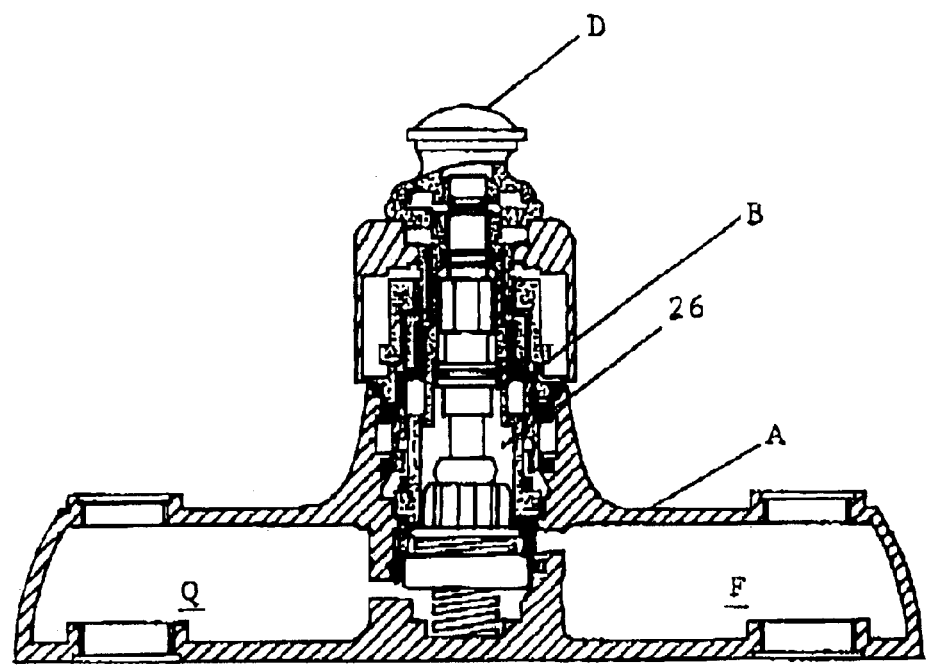

The dual control thermostatic mixer, according to the invent, shown on FIGS. 1, 2 and 3, shows a compact structure and includes the mixer body, generally referred to as A, an internal switching device referred to as B, a diverter lever handle referred to as C and a temperature regulating knob for the water exit, referred to as D.

The body of the mixer is T shaped when seen from a top view, having in each of its sides, connections for both hot and cold water supplies (valves) that are linked to their water-inlet channels, one for hot another for cold water.

The central part of the body of the mixer, is internally divided by four (4) ringed clefts or chambers, were the internal switching device mechanism (B) works. The lower cleft is for the hot water admittance; the next is for the cold water from the main supply, the third is for the water outlet that connects to the shower handset, and the upper and last cleft is for the spout exit. A thermostatic regulator controls the mixed-water temperature to the outlets.

As can be seen on FIGS. 4 to 11, the thermostatic regulator includes a valve body (4), a spindle (5), a rising piston (6), a thermostatic element (7) and a stabilizing and closing mechanism. This mechanism is made up of 2 springs (10, 13) and the closing valve set composed of a box (11) which is sealed through the upper central part of the mixer by a special o'ring able to undergo temperatures as far as 250° C.; a thermostat holder (9) and a thermostatic regulator retainer (12).

The body of the valve (4) can be made of brass or a composite material of nylon and fibreglass. There are six vertical/oval slashes along the body that enable a bigger water flow either at high or low pressures, avoiding the hydraulic noises caused by the water draining.

There is an o'ring in the lower part (21) for sealing the valve body itself when attached to the body of the mixer, an o'ring (20) on the intermediate section to seal the water chambers connected to the spout or the handset, as well as an o'ring (19) at the upper part to seal the body of the valve (4) with the switching device (2).

The body of the valve (4) carries at the upper part, a 24 mm spline with about 18 mm diameter to be used as a holder for the temperature scale (not represented). The spindle (5) holds the temperature regulating knob and fits within the mobile piston acting together with the thermostatic element, enabling the mechanism to act as a stabilizer and shutter for the water temperature. This can also be made of nylon and fibreglass composite materials; which control the temperature of the mixed water. Hot water flows in through the lower part of the stabilizing and shutter mechanism and the body of the mixer (A) and cold water flows in through the upper part of the stabilizing mechanism and the lower part of the thermostatic element (7).

The stabilizing mechanism is put into action by the thermostatic element (7) whose upper part is leaned to the inferior part of the mobile piston (6) and by means of an annular part in its middle section leaning on with a washer on the superior base of the thermostat holder.

When cold and hot water are in contact with the thermostatic element (7), this one dilates or contracts according to the desired preset temperature by opening or closing hot or cold water supplies.

Water switching to the spout or to the handset is done by a switching-device made of three cylindrical elements: the body (1), the valve switch (3) and the switch capsule (2).

The valve switch (3) contains: an o'ring (16) to seal the lower part of the switch, a slash or hole for the water flow and an outside hexagonal of 30 mm. Having on its upper part, a 4 way outside thread with a 5 mm pitch were the switch capsule (2) fits. This capsule has an inner 4 way thread also with a 5 mm pitch at the lower part, two external housing recesses; one for the o'ring (15) and another for the circlip (17) that will hold the valve set (3) and the switch capsule (2) on the body of the switch valve (1).

The switch body (1) has at the base, a 42 mm outer thread with a 19 pitch to be attached to the mixers body (A) and on top of it, a recess for an o'ring (14) to seal the switch body (1) from the mixer (A). In the inner part of the switch body (1), there is a 30 mm hexagonal that fits into the switch valve avoiding it to spin when you switch the mixed water supply to the spout or to the handset.

The switch valve (1) slides from 0 to 10 mm. This is done by using a handle that spins at 90°.

Figure 4:
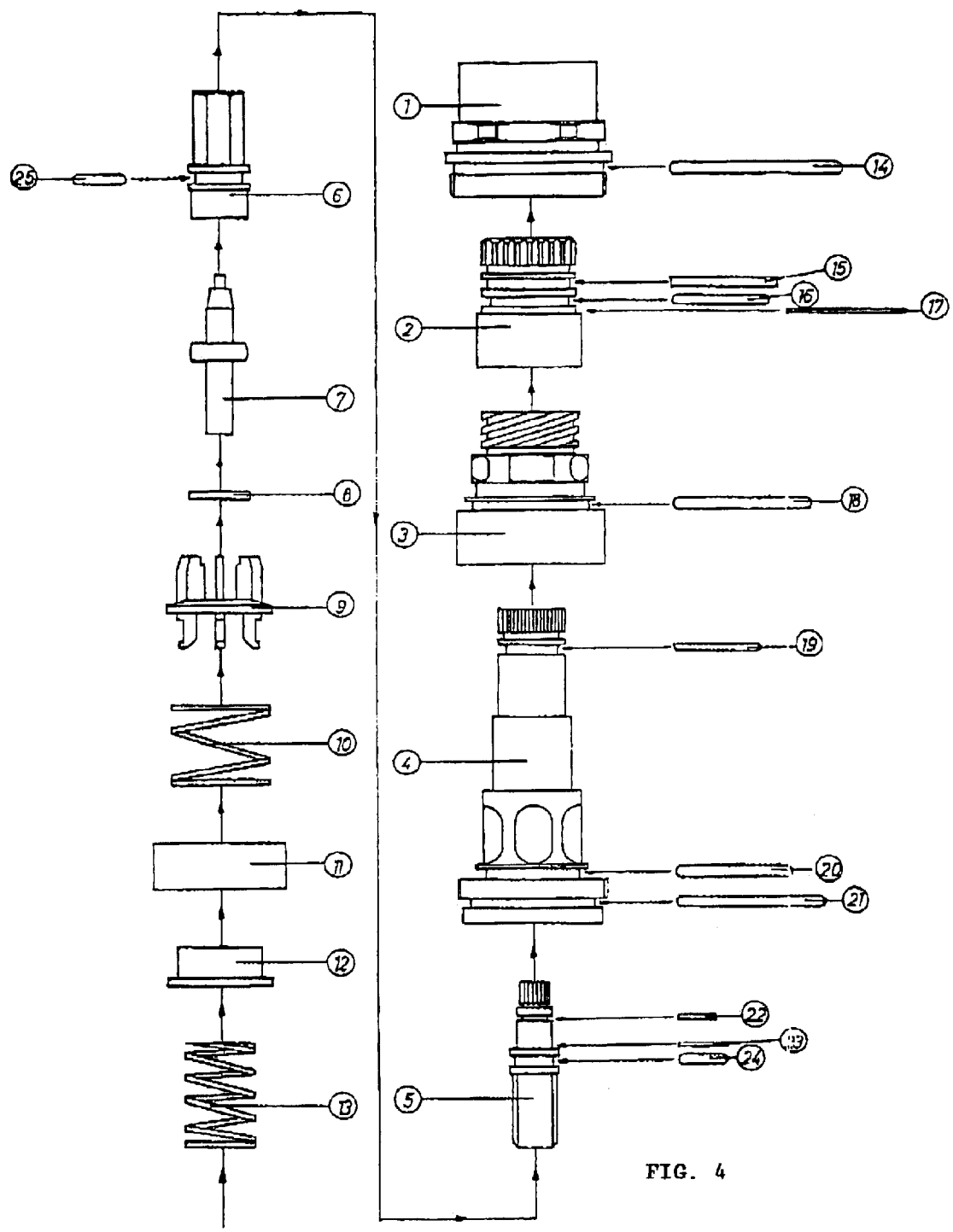
FIG. 4 is a sequential view of the assembly of the thermostatic set.
Figure 5:
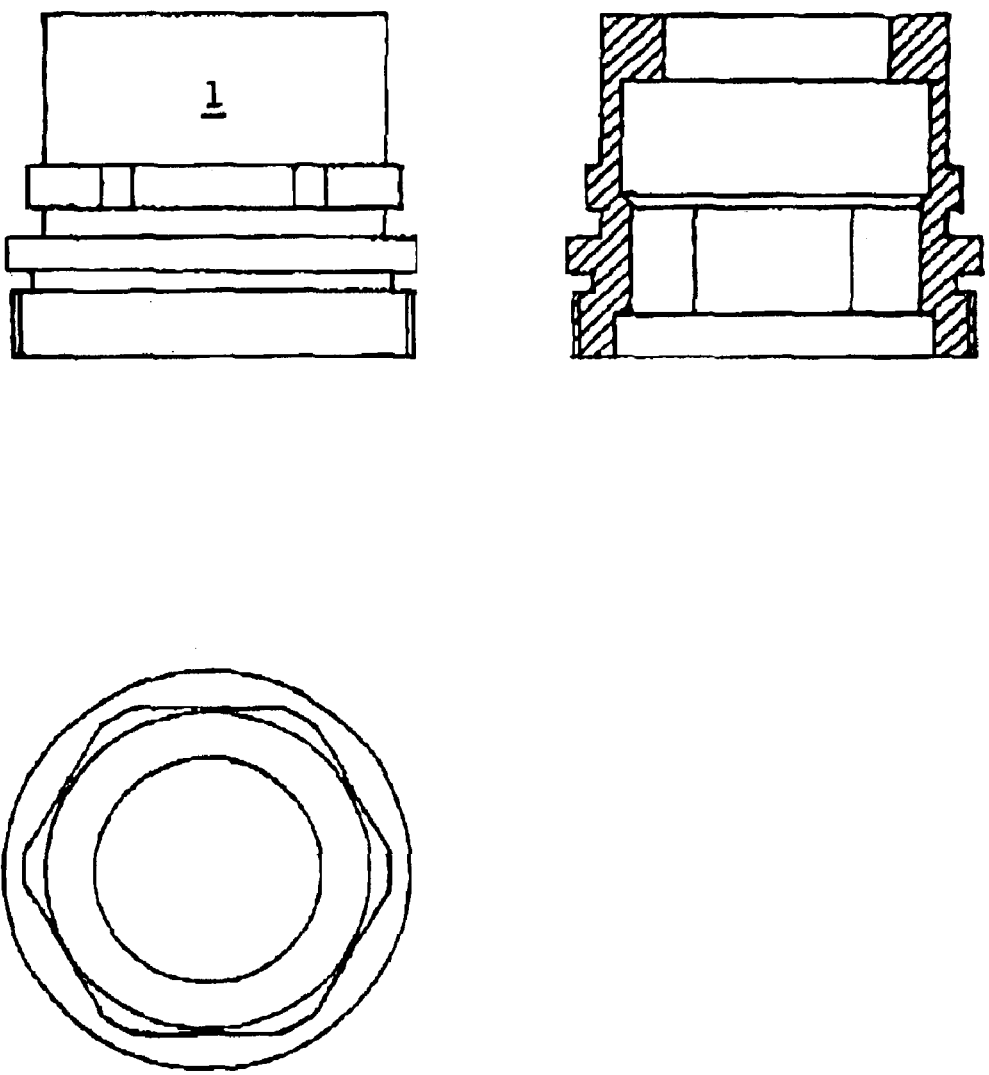
FIG. 5 shows a sectional view, a side view and a top view of the mixer shifting valve mechanism.
Figure 6:
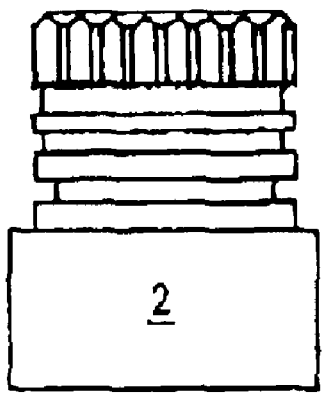
FIG. 6 shows a side-view, a sectional view and a bottom view of the shifting valve capsule.
Figure 6:
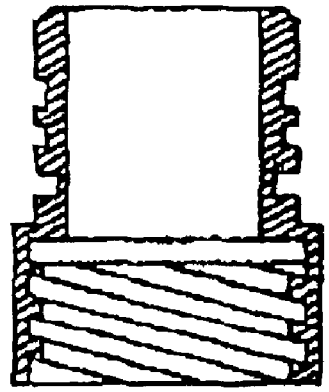
Figure 6:
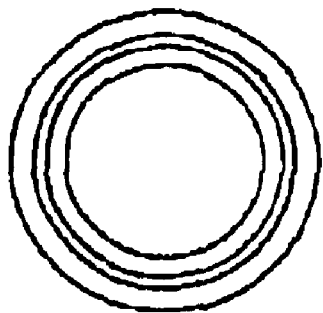
Figure 7:
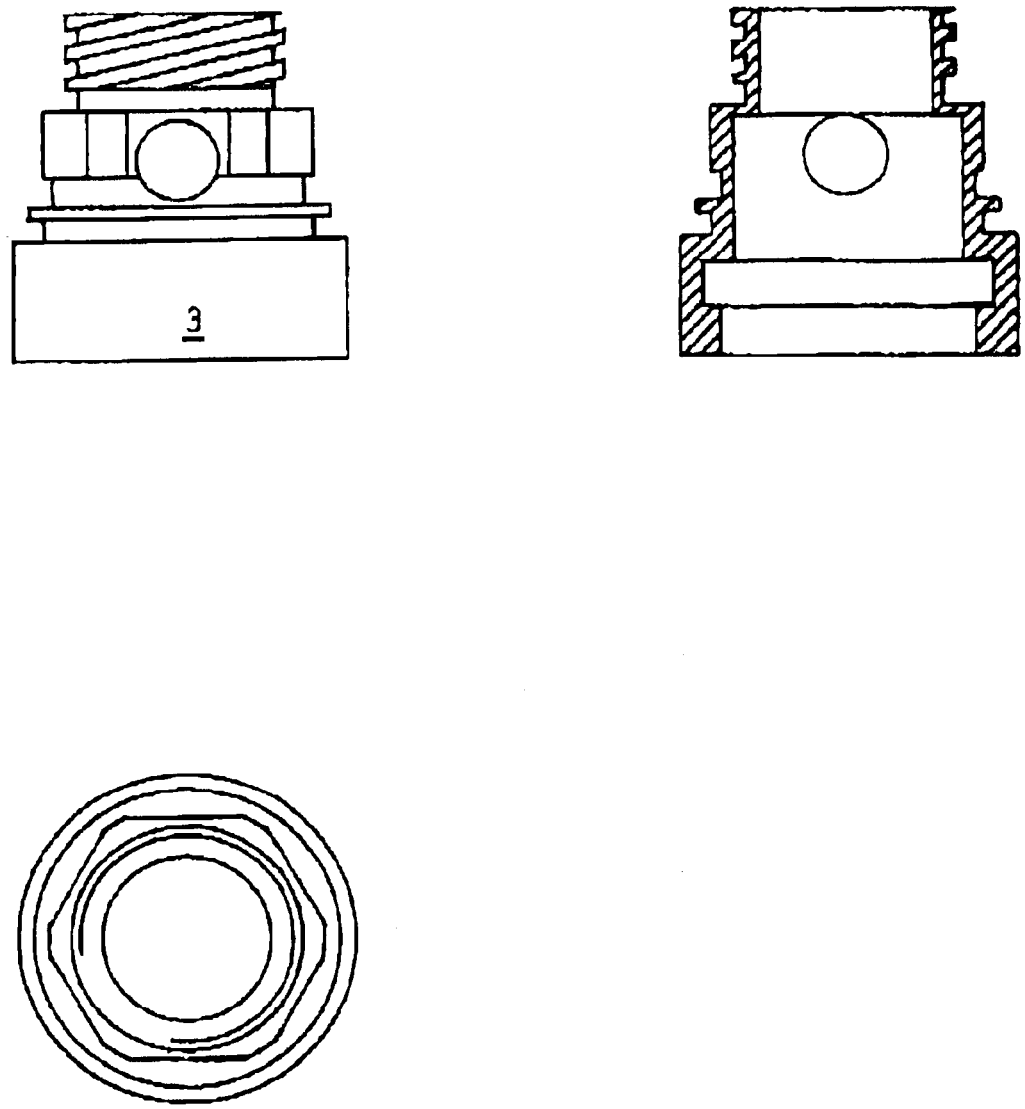
FIG. 7 shows a side-view, a sectional view and a bottom view of the switching device.
Figure 8:
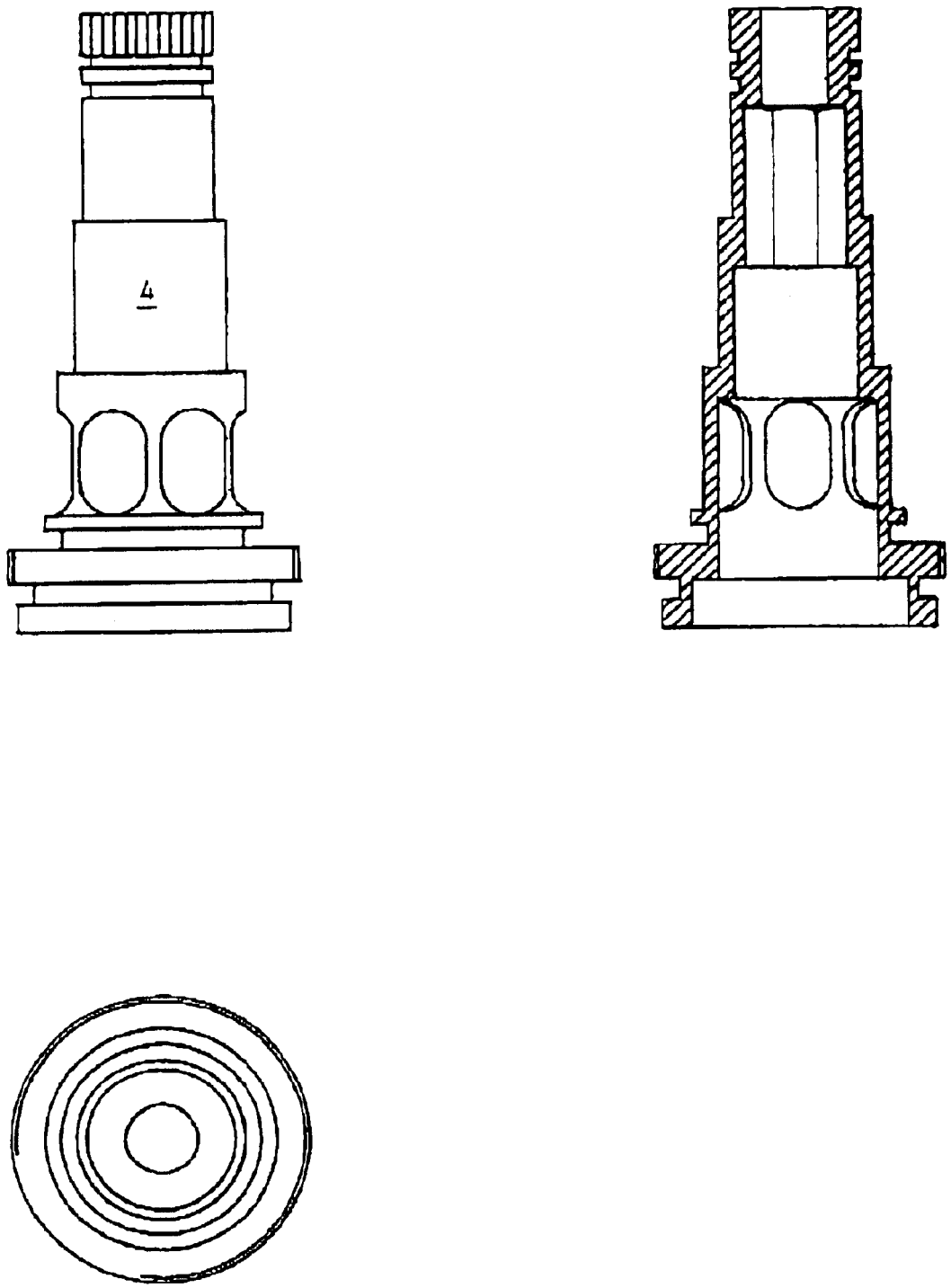
FIG. 8 shows a side-view, a cut view and a bottom view of the shifting valve thermostatic regulator of the mixer.
Figure 9:
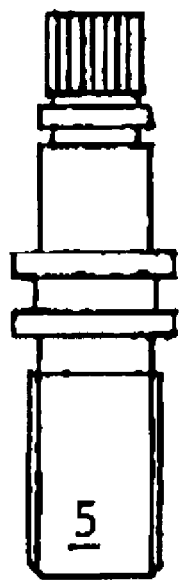
FIG. 9 shows a side-view, a sectional view and bottom view of the thermostatic regulator's fine-tuning spindle.
Figure 9:
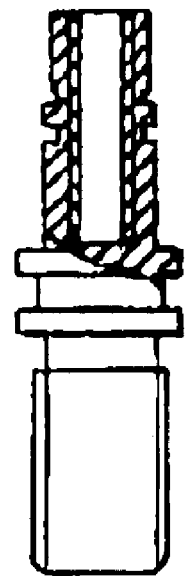
Figure 9:
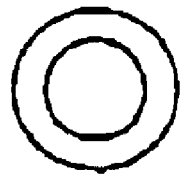
Figure 10:
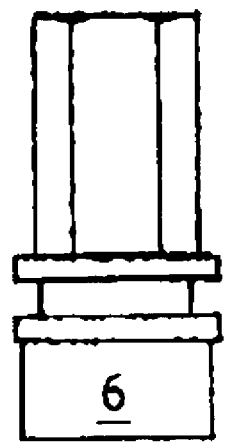
FIG. 10 shows a side-view, a cut view and bottom view of the thermostatic regulator fine-tuning piston.
Figure 10:
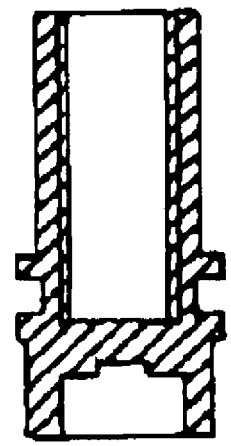
Figure 10:
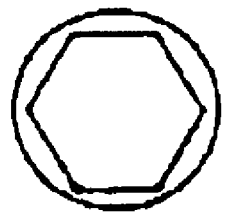
Figure 11:
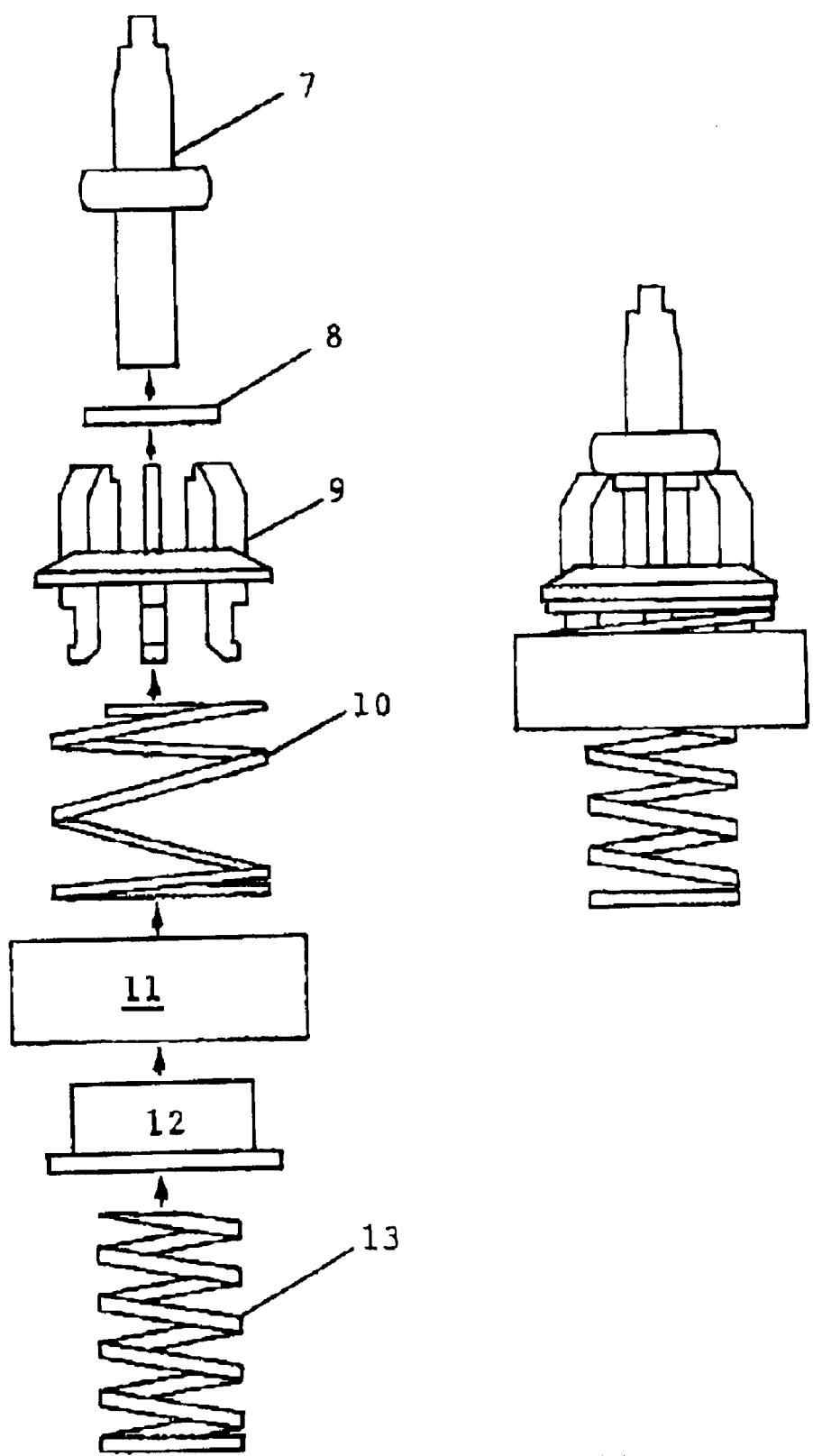
FIG. 11 shows an exploded side-view of the thermostatic element and the stabilizing mechanism of the mixer thermostatic regulator as well as a side-view of the fully assembled set.

As can be seen on the sectional view of FIG. 3, hot water flows in after opening the hot water interrupting valve (not represented) passing through the hot water channel (Q) and entering the central part of the body of the mixer, passing through a chamber that is located in the lower part of the centre of the body of the mixer (A), which can be closed by the side wall of the box 11 (FIGS. 4 and 12).

In this same FIG. 3 we can see that cold water flows after opening the interrupting valve of the hot water (not represented), flowing through the cold-water channel (F), and flowing on the central section of the body of the mixer. near the upper part of the stabilizing mechanism and the lower part of the thermostatic element (7), which can be closed by the side-wall of box 11 (FIGS. 4 and 12).

Cold water entering the central part of the body of the mixer suffers a restriction due to the existence of a ringed slash around the thermostatic holder (9) that also is used for supporting the upper part the spring (10). (See FIGS. 4–12)

Both cold and hot water upon entering the chambers, will reach the lower part of the thermostatic element (7) (See FIGS. 4–12) causing it to act. The element is supported by a washer, which in turn rests on the thermostatic element holder (9). This holder is linked to the retainer of thermostatic element (12), sliding the box (11) from the stabilizing mechanism, whose peripheral wall, partially closed according to the inlet of hot and cold water, adjusting a constant temperature to the resulting mixed cold and hot water, causing a constant water temperature, result of the mixing of both waters.

The already mixed water, with its temperature already set by the thermostatic regulator, will then move from the chamber 26 (FIG. 3) to one of the outlets of the mixed water, in this case the one that is currently open (handset or spout).

The fine-tuning of the temperature of the outlet water is done by using a knob (D) (FIGS. 1 and 3) laid on top of the switch handle (C) which in turn is linked to a rod (5) (FIGS. 4–10–11–12) connected to the piston (6) that moves up or down, putting more or less pressure on the upper part of the thermostatic element, allowing a fine-tuning of the temperature of the mixed water between 25° to 53° although it comes with a factory default preset temperature of 42° for safety reasons.

Please note that new features can be introduced to the dual control thermostatic mixer without changing all purposes/parameters claimed above.

What is claimed is:

1. A dual control thermostatic mixer comprising:

a switch handle lever;

a main body including a central part internally divided and separated by four circular chambers, wherein a lowest first chamber of the four circular chambers is configured to receive a hot water flow, a second chamber of the four circular chambers provided above the lowest chamber is configured to receive a cold-water flow, a third chamber of the four circular chambers provided above the second chamber is configured to carry a mixed water flow to a handset, and an upper fourth chamber of the four circular chambers provided above the third chamber is configured to carry a mixed water flow to a spout; and a switching valve set configured to operate in the central part of the main body includes a thermostatic regulator and a switching device, said thermostatic regulator being configured to regulate the hot water flow from the first chamber to one of the third and fourth chambers, according to a position of the switching device, and said thermostatic regulator also being configured to regulate the cold-water flow from the second chamber to one of the third and fourth chambers, according to a position of the switching device, wherein said switch handle lever is configured to control a position of the switching device.

2. The dual control thermostatic mixer according to claim 1, wherein the thermostatic regulator includes a valve body including at least one of brass and composite nylon-fibreglass materials.

3. The dual control thermostatic mixer according to claim 2, wherein the composite nylon-fibreglass are 70% Nylon and 30% fibreglass in composition.

4. The dual control thermostatic mixer according to one of claims 2 and 3 wherein the valve body includes six vertical, oval grooves configured to enable increased water flow at high or low pressures, and to avoid a hydraulic water draining noise.

5. The dual control thermostatic mixer according to claim 1, wherein the switch valve is configured to move 8 mm to 12 mm along a central axis of the switch capsule when the switch handle is turned 90°.

6. The dual control thermostatic mixer according to any one of claims 1 and 5, wherein an upper part of the switch valve includes a 4 way exterior thread with a 5 mm pitch, and a lower part of the switch capsule includes an inner 4-way thread with a 5 mm pitch, said switch capsule being configured to fit in the switch valve.

* * * * *